United States Patent [19]

Giles

[11] 3,892,529

[45] July 1, 1975

[54] RAPID DIGESTION PROCESS FOR DETERMINATION OF TRICHINELLAE IN MEAT

[75] Inventor: Paul M. Giles, Los Alamos

[73] Assignee: The United States of America as represented by the United States Energy Research and Development Administration, Washington, D.C.

[22] Filed: Apr. 1, 1974

[21] Appl. No.: 456,995

[52] U.S. Cl. .............................................. 23/230 B
[51] Int. Cl.² ......................................... G01N 33/16
[58] Field of Search ................................... 23/230 B

[56] References Cited
UNITED STATES PATENTS
3,586,859   6/1971   Katz et al. .......................... 23/230 B OTHER PUBLICATIONS
Davidsohn et al., Clinical Diagnosis By Laboratory Methods, W. B. Saunders Co., 1969. Page 951 relied on.

Primary Examiner—Robert M. Reese
Attorney, Agent, or Firm—John A. Horan; Paul D. Gaetjens

[57] ABSTRACT

An accelerated digestion process for releasing trichinellae from meat (usually pork) as excysted and encysted worms in transparent fluid whereby they may be easily identified and/or counted visually or automatically. This improved digestion process for the determination of trichinellae in meat comprises placing the meat in a blender, adding a digestant consisting of one of the following ingredients, namely sodium hypochlorite, hydrochloric acid and pepsin, bromelin, trypsin, or dilute papain; and blending the meat and digestant for about one minute and then pouring the solution into a receptacle, allowing particulate to settle to the bottom, extracting samples from the bottom of said receptacle, and visually or automatically identifying and/or counting any trichinellae that may be present.

6 Claims, No Drawings

RAPID DIGESTION PROCESS FOR DETERMINATION OF TRICHINELLAE IN MEAT

BACKGROUND OF THE INVENTION

1. Field of the Invention

This invention is concerned with an accelerated digestion process for releasing trichinellae from pork whether said trichinellae exists as excysted or encysted worms. The major improvement of this invention is directed to inexpensive digestants and a rapid digestion period which allows the determination of the number of trichinellae in pork that is compatible with a slaughterhouse production line.

2. Prior Art

The digestion method of separating trichinellae from meat, and then counting the individual trichinellae, has been the classical approach to this problem in the prior art. There are several drawbacks to the classical digestion method: (1) digestion and settling times have been measured in hours, (2) active filtration (i.e., the worms crawling through filter material) is dependent upon keeping the worms alive and completely excysted, (3) digestion materials and concentrations are expensive, and (4) counting techniques are tedious and reasonably uncertain. The net effect of these drawbacks is that the digestion process has not been adapted to production line testing, and proposals to control trichinellosis based on this method involve great expense.

Techniques are described in the prior art, namely those using artificial gastric juice, i.e., hydrochloric acid and pepsin as the digestant. One major objection to these techniques is the length of the digestion cycle.

SUMMARY OF THE INVENTION

An improved digestion process for determination of trichinellae in meat comprising placing the meat in a blender, adding a digestant consisting of dilute solutions of sodium hypochlorite, or hydrochloric acid and pepsin, or papain, or bromelin, or trypsin, blending for about 1 minute, pouring the solution into a receptacle, allowing any particulate to settle to the bottom of said receptacle, extracting samples from the bottom of said receptacle, and visually or automatically counting any trichinellae that may be present.

DESCRIPTION OF THE PREFERRED EMBODIMENT

One successful embodiment of this invention involves the following digestion schedule and parameters:

Digestant : 1 N. HCl and 1% pepsin
Temperature : 40°C
Blending : 2 minutes (food blender — low speed)
Stirring : 4 minutes (magnetic, adjusted to foam point)
Settling : About 5 minutes in stoppered funnel — without filtration
Extraction : Gravity release from bottom of funnel
Counting : Visual observation (microscope)

The stirring can be eliminated but blending period is extended for 4 minutes with similar results. A series of experiments demonstrated that the digestant HCl and pepsin could be reduced to 0.01 N HCl and 0.4% pepsin, other parameters remaining the same.

I have found that the preferred embodiment of this invention as regards a suitable digestant involves the use of dilute sodium hypochlorite. The sodium hypochlorite involves 0.55 volume percent to 0.10 volume percent in an aqueous solution. The sample meat and the digestant, sodium hypochlorite, are processed in a food blender for 1 minute and the solution is poured into a stoppered, tapered receptacle without filtering. The *trichinellae* settle rapidly to the bottom of the receptacle either by gravity or an agglomeration to a dense additive. Sampling from this receptacle allows one to observe and count the *trichinellae* if they are present.

Other digestants which could be substituted for either the hydrochloric acid and pepsin or the dilute sodium hypochlorite are the following: bromelin, trypsin, and papain. These latter digestants are relatively more expensive than either of the preferred embodiments, namely hydrochloric acid and pepsin or dilute sodium hypochlorite. However, they may be desirable digestants for particular study of *trichinellae* but not in a production process such as found in a slaughterhouse. The bromelin, papain, and trypsin are used in low or dilute concentrations, that is, less than 5 percent strength in an aqueous solution which has a pH range of 2.0 to 7.2. It is critical that the pH range be observed. Otherwise the *trichinellae* are digested and disappear, and thus cannot be counted.

Digestion of the meat samples by the digestants and concentrations developed by this invention produces a mixture of excysted and encysted (free, intact cysts) *trichinellae*, some alive and some apparently dead. Efforts to excyst completely were not successful, even with extreme concentrations of digestants and with extended times of exposures (up to 36 hours) in lower concentrations of digestants. All the *trichinellae* can be assayed by counting both excysted and encysted *trichinellae*, instead of only that portion that are alive and excysted (capable of crawling through a filter). Extreme concentrations of digestant, either acid or basic, were observed to consume a portion of the excysted worms; digestants in the pH range of 2.0 to 7.2 did not appear to consume the *trichinellae* over an observation period of 1 hour. Low infestations of *trichinellae*, like one-to-five per g, are detectable by the digestion method.

Evaluation of slaughterhouse processing of pork for detection and control of *trichinellae* infestation is of interest to the U.S. Department of Agriculture. The process disclosed herein is directed to inexpensive digestant materials that are faster than the digestants used in the prior art. In particular, sodium hypochlorite has been substituted for pepsin, which is an expensive enzyme. In addition to the reduction in cost of digestants the most important improvement has been the reduction in time necessary to detect and control the *trichinellae* in meat, that is, a digestion period measured in a few minutes versus hours as disclosed in the prior art.

In my invention, I have concentrated on ways of speeding up the digestion process using the most practical and inexpensive materials and by varying the following parameters:

1. Variations of concentrations (HCl and pepsin, sodium hypochlorite)
2. Agitation
   a. ultrasonic
   b. magnetic stirring
   c. blending
3. Temperature variations 4. Time variations
5. Digestants
6. Predigestion processing
   a. compressing
   b. blending
   c. chopping.

I claim:

1. An improved digestion process for determination of *trichinellae* in meat comprising placing the meat in a blender, adding at least a digestant selected from the class consisting of sodium hypochlorite, hydrochloric acid and pepsin, papain, bromelin, or trypsin, said digestant having a pH range of 2.0 to 7.2, blending for about 1 minute, pouring the solution into a receptacle allowing any particulate to settle to the bottom of said receptacle, extracting samples from the bottom of said receptacle, visually or automatically counting any *trichinellae* that may be present, and the total digestion period is of the order of a few minutes.

2. The process of claim 1 in which the digestant is dilute sodium hypochlorite in the range of 0.10 to 0.55 volume percent.

3. The process of claim 1 in which the digestant is 0.01 N to 1.0 N hydrochloric acid and pepsin in the range of 0.4 to 1.0 volume percent.

4. The process of claim 1 in which the digestant is papain.

5. The process of claim 1 in which the digestant is bromelin.

6. The process of claim 1 in which the digestant is trypsin.

* * * * *